United States Patent
Han et al.

(10) Patent No.: US 10,236,559 B2
(45) Date of Patent: Mar. 19, 2019

(54) THREE-SLOTTED ANTENNA APPARATUS AND METHOD

(71) Applicant: Futurewei Technologies, Inc., Plano, TX (US)

(72) Inventors: Chulmin Han, San Diego, CA (US); Wee Kian Toh, San Diego, CA (US); Wei Huang, San Diego, CA (US); Hongwei Liu, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 1 day.

(21) Appl. No.: 15/488,308

(22) Filed: Apr. 14, 2017

(65) Prior Publication Data
US 2018/0301787 A1    Oct. 18, 2018

(51) Int. Cl.
*H01Q 1/24* (2006.01)
*H01Q 5/50* (2015.01)
(Continued)

(52) U.S. Cl.
CPC ............... *H01Q 1/243* (2013.01); *H01Q 1/48* (2013.01); *H01Q 5/50* (2015.01); *H01Q 13/18* (2013.01);
(Continued)

(58) Field of Classification Search
CPC .......... H01Q 1/243; H01Q 5/50; H01Q 13/18; H01Q 1/48; H01Q 1/24; H04B 7/0413; H04B 7/0404; H04B 7/04
(Continued)

(56) References Cited

U.S. PATENT DOCUMENTS

| 9,564,683 B2 * | 2/2017 | Won ....................... H01Q 5/335 |
| 2014/0292590 A1 * | 10/2014 | Yoo ......................... H01Q 1/243 |
| | | 343/702 |

(Continued)

FOREIGN PATENT DOCUMENTS

| CN | 103390793 A | 11/2013 |
| CN | 104810622 A | 7/2015 |

(Continued)

OTHER PUBLICATIONS

Cellular Insight, "Samsung Galaxy S7, the first 4×4 MIMO smartphone," Oct. 7, 2016, pp. 1-10, retreived from http://cellularinsights.com/samsung-galaxy-s7-the-first-4x4-mimo-smartphone/.

(Continued)

*Primary Examiner* — Jean B Jeanglaude
(74) *Attorney, Agent, or Firm* — Daniel Burns

(57) ABSTRACT

An apparatus and associated method are provided involving a housing having a periphery configured to operate as a second antenna, a third antenna, and a fourth antenna. The periphery includes a top wall having a first slot formed therein, a first side wall having a second slot formed therein, and a second side wall having a third slot formed therein. The top wall is arranged between the first side wall and the second side wall, and a top portion of the periphery is defined between the second slot and the third slot. The top portion is divided into a first top side portion and a second top side portion via the first slot. Further, the first top side portion operates as the second antenna, and the second top side portion operates as both the third antenna and the fourth antenna.

25 Claims, 14 Drawing Sheets

(51) Int. Cl.
*H01Q 1/48* (2006.01)
*H01Q 13/18* (2006.01)
*H04B 7/0404* (2017.01)
*H04B 7/0413* (2017.01)

(52) U.S. Cl.
CPC ......... *H04B 7/0404* (2013.01); *H04B 7/0413* (2013.01)

(58) Field of Classification Search
USPC .......................................................... 343/702
See application file for complete search history.

(56) References Cited

U.S. PATENT DOCUMENTS

| | | | | |
|---|---|---|---|---|
| 2014/0333486 A1* | 11/2014 | Greetis | .................... | H01Q 1/52 343/702 |
| 2015/0048979 A1* | 2/2015 | Asrani | ................... | H01Q 1/243 343/702 |
| 2015/0200463 A1 | 7/2015 | Heikura et al. | | |
| 2017/0048363 A1* | 2/2017 | Lee | ........................ | H01Q 1/243 |

FOREIGN PATENT DOCUMENTS

| | | |
|---|---|---|
| CN | 105305028 A | 2/2016 |
| CN | 105337022 A | 2/2016 |

OTHER PUBLICATIONS

Ray, N., "LTE Advanced is so 2014. We're already on to the next big thing. Verizon is now 50% faster . . . and still slower than T-Mobile!" T-Mobile, Sep. 6, 2016, pp. 1-4, retrieved from https://newsroom.t-mobile.com/news-and-blogs/lte-advanced.htm.

Torres, J., "Galaxy Note 7 shown to be first phone supporting 4×4 MIMO," SlashGear, Aug. 10, 2016, pp. 1-9, retrieved from https://www.slashgear.com/galaxy-note-7-shown-to-be-first-phone-supporting-4x4-mimo-10451338/.

* cited by examiner

THREE-SLOTTED ANTENNA APPARATUS AND METHOD

FIELD OF THE INVENTION

The present disclosure relates to antennas, and more particularly to conformal antennas.

BACKGROUND

As more and more subscribers and devices load networks, there is an increased demand for more coverage, spectral efficiency, and/or peak throughput. Technology such as long term evolution (LTE), LTE-Advanced, and permutations thereof have attempted to address such needs. For example, LTE-Advanced provides 8×8 multiple-input-multiple output (MIMO) operation in downlink connections and 4×4 MIMO in uplink connections. However, supporting such technology in mobile devices (e.g. user equipment (UE), etc.) may be complicated by mobile device size, the need to accommodate other componentry such as large displays, preferred industrial designs (IDs), etc.

SUMMARY

An apparatus is provided including a housing having a periphery configured to operate as a second antenna, a third antenna, and a fourth antenna. The periphery includes a top wall having a first slot formed therein, a first side wall having a second slot formed therein, and a second side wall having a third slot formed therein. The top wall is arranged between the first side wall and the second side wall, and a top portion of the periphery is defined between the second slot and the third slot. The top portion is divided into a first top side portion and a second top side portion via the first slot. Further, the first top side portion operates as the second antenna, and the second top side portion operates as both the third antenna and the fourth antenna.

Also provided is a method including creating a housing having a periphery including a top wall, a first side wall, and a second side wall. Such periphery is configured to operate as a second antenna, a third antenna, and a fourth antenna. The method further comprises etching at least three slots in a top portion of the periphery including a first slot formed in the top wall, a second slot formed in the first side wall, and a third slot formed in the second side wall, for dividing the top portion into a first top side portion that operates as the second antenna, and a second top side portion that operates as both the third antenna and the fourth antenna.

A system is also provided including a mobile device with a housing having a periphery configured to operate as a second antenna, a third antenna, and a fourth antenna. The periphery includes a top wall having a first slot formed therein, a first side wall having a second slot formed therein, and a second side wall having a third slot formed therein. The top wall is arranged between the first side wall and the second side wall, and a top portion of the periphery is defined between the second slot and the third slot. The top portion is divided into a first top side portion and a second top side portion via the first slot. Further, the first top side portion operates as the second antenna, and the second top side portion operates as both the third antenna and the fourth antenna.

Optionally, in any of the preceding embodiments, the second antenna may include a second antenna feed extending inwardly from the top wall of the housing, and a second antenna ground.

Optionally, in any of the preceding embodiments, further provided is a configurable element in electrical communication with the second antenna feed. As an option, the configurable element may include a switch and a resistive element, a capacitive element, and/or an inductive element.

Optionally, in any of the preceding embodiments, the second antenna may be configured to be switched between a first mode of operation for operating at a first frequency range and a second mode of operation for operating at a second frequency range.

Optionally, in any of the preceding embodiments, a first size of the first top side portion and a second size of the second top side portion may be the same. In other embodiments, such may not necessarily be the case.

Optionally, in any of the preceding embodiments, the third antenna and the fourth antenna may share a common ground. As an option, the third antenna and the fourth antenna may be connected to the common ground via spaced adjacent fixed conductive elements.

Optionally, in any of the preceding embodiments, the third antenna and the fourth antenna may be grounded to a camera in the housing.

Optionally, in any of the preceding embodiments, the third antenna may include a third antenna feed extending inwardly adjacent to a center of the top wall of the housing.

Optionally, in any of the preceding embodiments, the fourth antenna may include a fourth antenna feed extending inwardly from the top wall of the housing.

Optionally, in any of the preceding embodiments, the four antennas may be configured to operate as a 4×4 multiple-in-multiple-out (MIMO) antenna.

Optionally, in any of the preceding embodiments, further provided is an insulative material positioned in each of the slots.

Optionally, in any of the preceding embodiments, the second slot formed in the first side wall and the third slot formed in the second side wall may be parts of a continuous slot formed in the back face of the housing, and the first slot formed in the top wall may be further formed in the back face of the housing and may extend to the continuous slot.

Optionally, in any of the preceding embodiments, the third antenna may be configured to cooperate with a global positioning system (GPS) so as to exhibit an upper hemisphere isotropic sensitivity (UHIS) ratio that is greater than −3 dB.

BRIEF DESCRIPTION OF THE DRAWINGS

FIG. 5B-1 is a back cross-sectional view of a housing, in accordance with another embodiment.

FIG. 5B-2 is a top cross-sectional view of a housing, in accordance with the embodiment shown in FIG. 5B-1.

FIG. 5C-1 is a back cross-sectional view of a housing, in accordance with another embodiment.

FIG. 5C-2 is a top cross-sectional view of a housing, in accordance with the embodiment shown in FIG. 5C-1.

FIG. 5D-1 is a back cross-sectional view of a housing, in accordance with another embodiment.

FIG. 5D-2 is a top cross-sectional view of a housing, in accordance with the embodiment shown in FIG. 5D-1.

DETAILED DESCRIPTION

Various embodiments are described herein for providing a housing (e.g. phone housing) with at least four antennas. To accomplish this, three slots are formed in the housing. In some optional embodiments, such slots are formed in a manner that divides the housing into symmetrical portions, for aesthetic purposes. By this design, the housing may serve as four antennas possibly configured to operate as a 4×4 multiple-in-multiple-out (MIMO) antenna that may be particularly useful to accommodate operating frequencies used in connection with advanced cellular protocol standards such as 4G, long term evolution (LTE), LTE-Advanced (LTE-A), 5G and further advancements thereof, etc. In the context of the present description, 4×4 MIMO refers to any antenna technology for wireless communications where four (4) antennas are used in connection with a transmitter and four (4) antennas are used in connection with a receiver for sending and/or receiving more than one data signal simultaneously over the same radio channel by exploiting multipath propagation (i.e. where radio signals reach a receiver by two or more paths, etc.).

Figure 1:
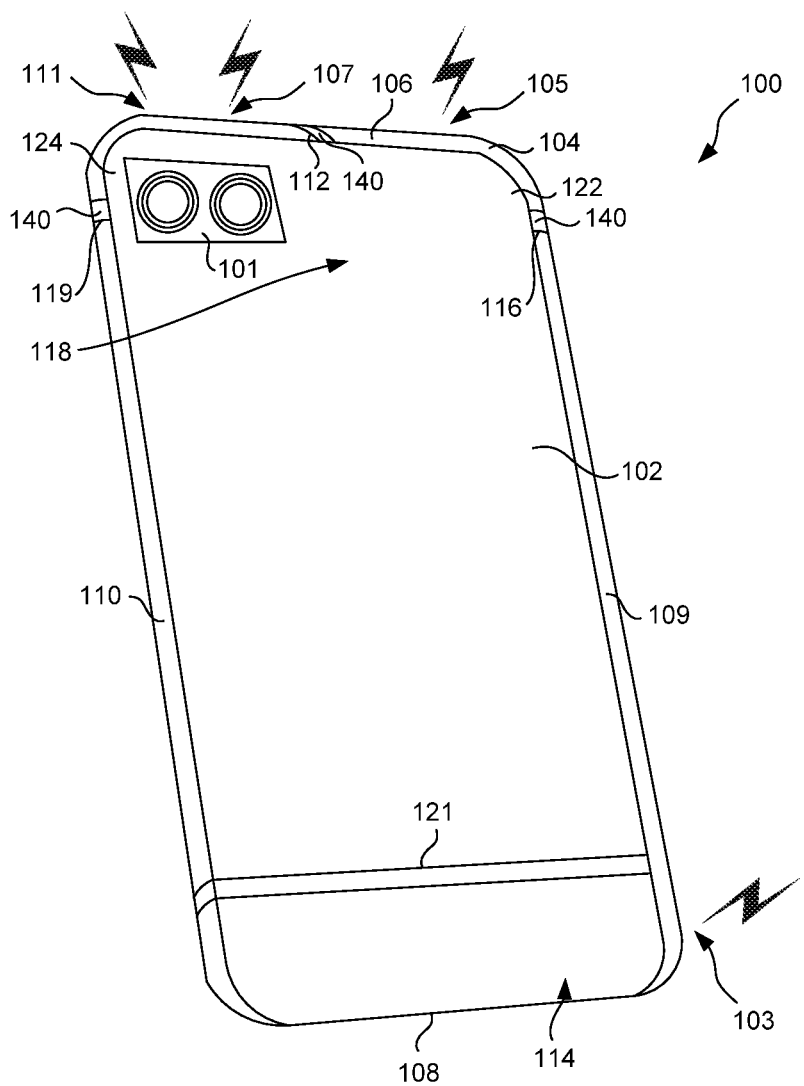
FIG. 1 is a perspective view of a housing equipped with at least four antennas, in accordance with an embodiment.
Figure 2:
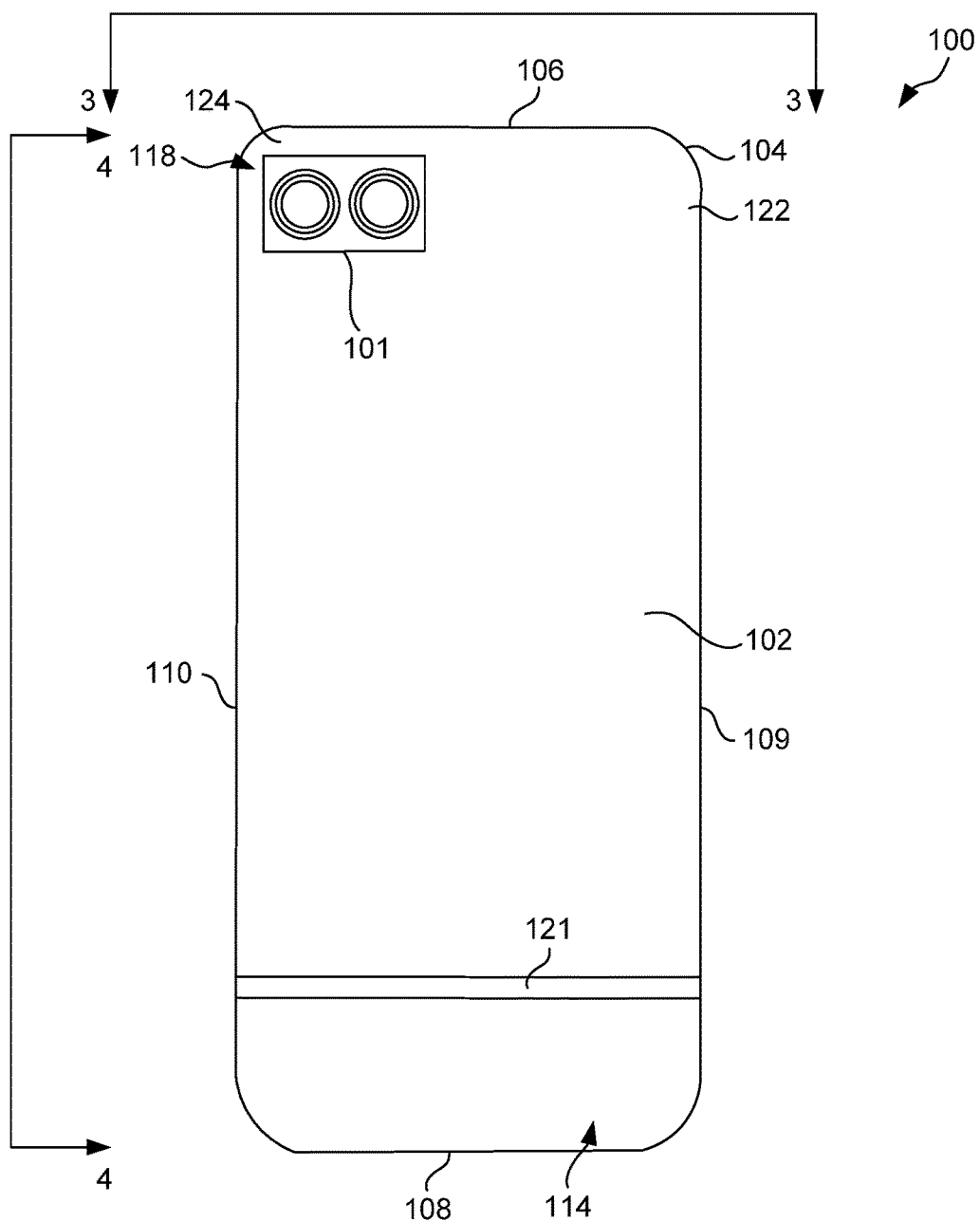
FIG. 2 is a plan view of the housing of FIG. 1 equipped with at least four antennas, in accordance with an embodiment.
Figure 3:
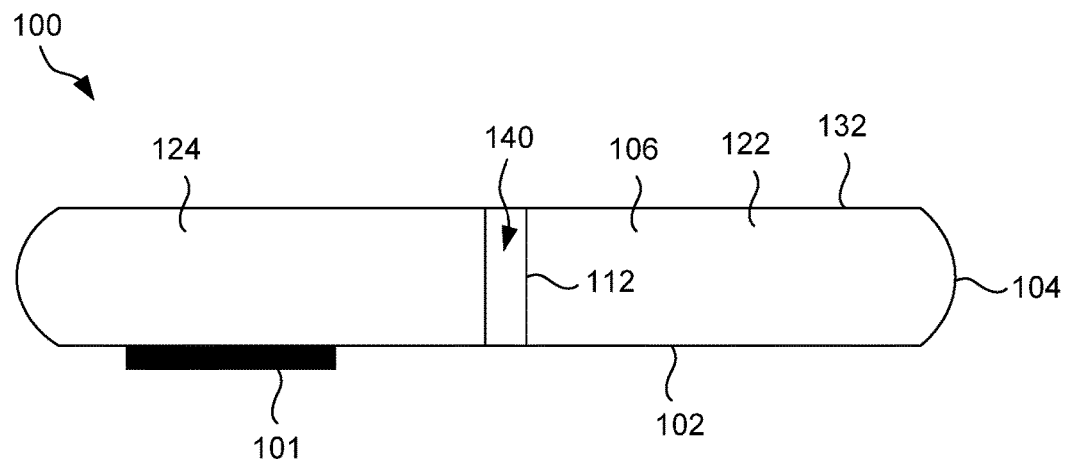
FIG. 3 is a top view of the housing taken along line 3-3 of FIG. 2, in accordance with an embodiment.
Figure 4:
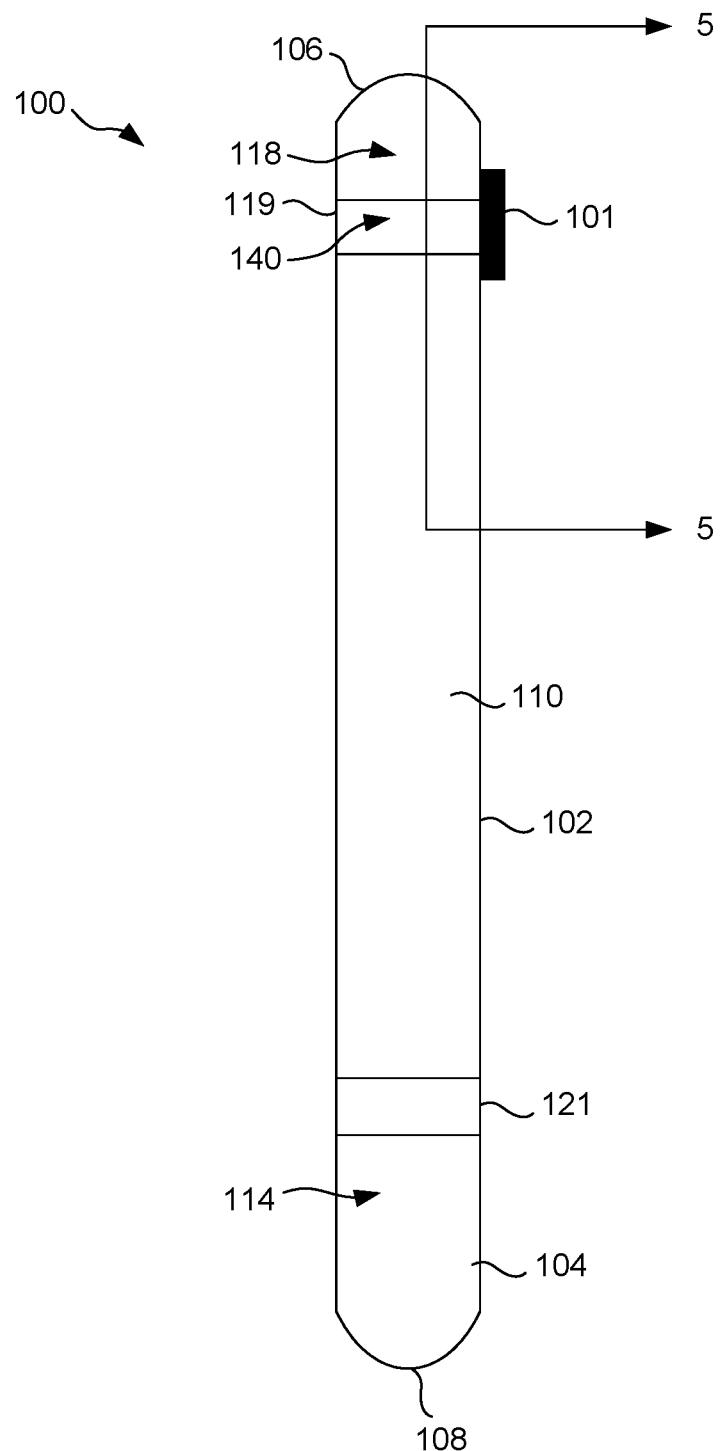
FIG. 4 is a side view of the housing taken along line 4-4 of FIG. 2, in accordance with an embodiment.

FIG. 1 is a perspective view of a housing 100 equipped with at least four antennas, in accordance with an embodiment. FIG. 2 is a plan view of the housing 100 of FIG. 1 equipped with at least four antennas, in accordance with an embodiment. Further, FIG. 3 is a top view of the housing 100 taken along line 3-3 of FIG. 2, in accordance with an embodiment. Still yet, FIG. 4 is a side view of the housing 100 taken along line 4-4 of FIG. 2, in accordance with an embodiment.

In various embodiments, the housing 100 is a component of a mobile device such as a phone, tablet, personal assistant, or any other mobile device. With that said, other embodiments are contemplated where the housing 100 is a component of other devices such as laptops, computers, portable electronic devices, Internet of Things (IoT) devices, etc.

As shown in FIGS. 1-4, the housing 100 is equipped with a back face 102 and a periphery 104 having a top wall 106, a bottom wall 108, and a pair of side walls (including a first side wall 109 and a second side wall 110). In the present description, a wall of a housing periphery may include a frame or other applicable structures for supporting components within the housing 100. The top wall 106 may be longitudinally arranged between side walls 109, 110 in a substantially perpendicular manner. Alternatively or optionally, the side walls 109, 110 may be defined substantially parallel with each other. In one embodiment, each of the walls 106, 108, 109, 110 of the periphery 104 is integrally coupled to edges of the back face 102 and extend outwardly therefrom such that at least a portion of each of the walls 106, 108, 109, 110 generally resides in a corresponding plane that is substantially perpendicular (e.g. with about 90 degree angular relationship) to a plane in which the back face 102 resides. Further, while the walls 106, 108, 109, 110 of the periphery 104 are shown to exhibit a certain level of curvature, other embodiments are contemplated where the walls 106, 108, 109, 110 of the periphery 104 exhibit more or less (or even no) curvature.

In the embodiment of the housing 100 illustrated in FIG. 1, the housing 100 is a component of a mobile phone. To this end, the housing 100 is equipped with a camera 101, as shown. Specifically, in one possible embodiment, the camera 101 may be mounted in the housing 100 with one or more lenses that extend through the housing 100 for being exposed to light. While the camera 101 is shown to be of a dual lens-type, it should be noted that the camera 101 may be of a single lens-type, possibly include a flash, or be omitted altogether. Still yet, other possible features of the housing 100 (unillustrated in FIG. 1) may include volume buttons, an on-off switch, a head phone jack, a power/network interface, speakers, a microphone, etc. Further, while not shown, a front face of the housing 100 may be open to allow the mounting of a touchscreen or the like, thereby forming an interior space in which a printed circuit board (PCB) and other componentry may be inserted. More information regarding some of these and other features of such mobile phone will be set forth later in greater detail.

As mentioned earlier, the housing 100 is configured to operate as at least four antennas including a first antenna 103, a second antenna 105, a third antenna 107, and a fourth antenna 111. To accomplish this, the housing 100 may be manufactured from a material that is at least partially conductive. For example, in one embodiment, the housing 100 may be constructed using a material that includes, at least in part, metal. Further, in various embodiments, a surface of the housing 100 may be lined with other possibly non-conductive material including, but not limited to glass, an elastomeric sheath, etc.

By this design, different portions of the housing 100 operate as the four antennas 103, 105, 107, 111. In other words, the material of the housing 100 itself operates as multiple antennas. To this end, the housing 100 serves as conformal antennas whereby the housing 100 has dual functions, namely to house/protect internal componentry, as well as operate as antennas. In the present description, an antenna may include any conductive material that is configured to radiate and/or receive radio frequency (RF) signals. Thus, the housing 100 and the four antennas 103, 105, 107, 111 are one in the same.

So that the housing 100 may serve as the four antennas 103, 105, 107, 111; a plurality of slots are formed in the housing 100 including a first slot 112, a second slot 116, and a third slot 119. As will be described later, the slots 112, 116, 119 may be formed in any desired manner including, but not limited to etching, cutting, stamping, etc. a surface of the housing 100, so that the housing 100 is separated into multiple pieces (e.g. portions, etc.). Further, adjacent pieces separated by a slot may be insulated between each other by the slot. Still yet, in the context of the present description, the slots 112, 116, 119 may refer to any opening, groove, or passage in the housing 100.

In various embodiments, such slots 112, 116, 119 may be of a same, similar, or different width and further extend through an entirety of the respective portion of the housing 100 so as to create separate portions of the housing 100 that may serve as the aforementioned four antennas. In one embodiment, the back face 102 may be isolated or insulated from the walls 106, 108, 109, 110 of the periphery 104, so that the aforementioned separate portions of the housing 100 may more readily serve as the aforementioned four antennas. In other embodiments, the back face 102 may be manufactured from (or lined with) an insulative material, in order to accomplish a similar result. In still other different embodiments (that will be elaborated upon during reference to FIG. 5E), the slots 112, 116, 119 may be continuously formed and interconnected, in order to provide further electrical isolation among the different separate portions of the housing 100. Further, a width of the slots 112, 116, 119 may be in the range of 0.5-5 mm, in order to ensure the structural integrity of the housing 100 while affording optimal antenna operation.

As a further option, an insulative material 140 may be positioned in one or more of the slots 112, 116, 119. Such insulative material 140 may include any material that is insulative, at least in part, including, but not limited to an elastomeric material, ceramic, mica, glass, plastic, metal oxide, air, and/or any other material that is more insulative, as compared to metal. Further, in various embodiments, the insulative material 140 may be injected within the slots 112, 116, 119 such that an outer surface of the insulative material 140 and the housing 100 are continuous, thereby forming an uninterrupted surface of the housing 100. As an additional option, a color of the insulative material 140 may be the same or similar to that of the housing 100.

Strictly as an option, a fourth slot 121 may be formed adjacent to the bottom wall 108 for defining a bottom portion 114 of the housing 100 that is configured to operate as the first antenna 103. It should be strongly noted that the illustrated size and location of the fourth slot 121 is purely illustrative in that any reconfiguration of the fourth slot 121 is contemplated. For example, the fourth slot 121 may be replaced with multiple slots for configuring the first antenna 103 to operate in any desired manner. Still yet, the fourth slot 121 may even be omitted in other embodiments.

With continued reference to the figures, the second and third slots 116, 119 are shown to reside adjacent to the top wall 106 for defining a top portion 118 of the periphery 104 of the housing 100. In various optional embodiments, top edges of the second slot 116 and the third slot 119 may be aligned and positioned anywhere within a range of 8-15 mm from the top wall 106 of the housing 100 at a point that is a distance from the top wall 106 which is equivalent to 5-12% of a length of the housing 100. In different embodiments, such distance may be augmented to increase a surface area of the top portion 118 and thereby improve operability of the second antenna 105, the third antenna 107, and the fourth antenna 111 in certain lower band frequencies (e.g. 700-1000 MHz). Specifically, by virtue of such larger surface area, RF signals with longer wavelengths are more easily propagated, where a length of such longer wavelengths are inversely proportional to frequency (such that lower band frequency operation is improved).

With continuing reference to FIG. 1, the first slot 112 is formed in the top wall 106 of the housing 100, for dividing the top portion 118 into a first top side portion 122 that operate as the second antenna 105, and a second top side portion 124 that operate as both the third antenna 107 and the fourth antenna 111. In one embodiment, a first size of the first top side portion 122 and a second size of the second top side portion 124 of the top portion 118 are the same or substantially the same. Other embodiments are contemplated, however, where the first top side portion 122 and the second top side portion 124 are asymmetrical in shape, width, and/or length.

By this design, the housing 100 is equipped with at least the four antennas 103, 105, 107, 111 that exist as a result of the incorporation of the three slots 112, 116, 119 in the housing 100. In some optional embodiments, such slots 112, 116, 119 may be formed in a manner that divides the housing into symmetrical portions, for aesthetic purposes depending on a desired industrial design (ID). To this end, the housing 100 may serve as the four antennas 103, 105, 107, 111 and may even be possibly configured to operate as a 4×4 MIMO antenna that may be particularly useful to accommodate operating frequencies used in connection with advanced cellular protocol standards such as 4G, LTE, LTE-A, 5G and further advancements thereof, etc.

Figure 5A:
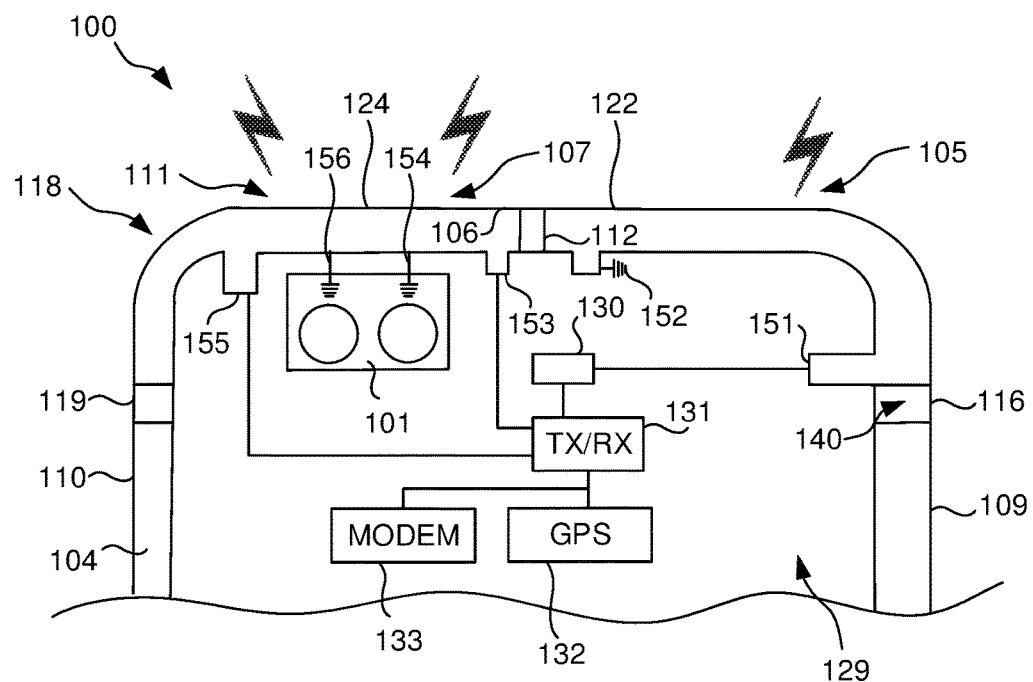
FIG. 5A is a cross-sectional view of the housing taken along line 5-5 of FIG. 4, in accordance with an embodiment.

FIG. 5A is a cross-sectional view of the housing 100 taken along line 5-5 of FIG. 4, in accordance with an embodiment. As shown, the housing 100 has, mounted therein, a PCB 129 with various components installed thereon. Specifically, the PCB 129 has, mounted thereon, the camera 101 positioned at the second top side portion 124 of the housing 100, a transceiver 131 (e.g. transmitter and/or receiver) positioned at the first top side portion 122 of the housing 100, as well as a GPS 132 and a modem 133 in electrical communication with the transceiver 131. It should be noted that, in the context of the present description, "electrical communication" may refer to any direct coupling and/or indirect coupling (with one or more electrical components positioned therebetween).

With continuing reference to FIG. 5A, each of the antennas 105, 107, 111 has an associated feed member and ground. In the present description, an antenna feed includes a portion of an antenna to which supporting circuitry (e.g. a transceiver, etc.) is electrically coupled so that, during transmission, current may flow from the antenna feed, through the antenna, and then to ground, thereby radiating RF signals. Further, during reception, RF signals may be detected via the antenna and corresponding generated current may flow to the antenna feed, for being fed to supporting circuitry for demodulation.

Specifically, the second antenna 105 has a second antenna feed member 151 and a second antenna ground 152, the third antenna 107 has a third antenna feed member 153 and a third antenna ground 154, and the fourth antenna 111 has a fourth antenna feed member 155 and a fourth antenna ground element 156, as shown. As further shown, the second antenna feed member 151, the third antenna feed member 153, and the fourth antenna feed member 155 are in electrical communication with the transceiver 131 via a wire, clip, or other conductive material. Still yet, in one embodiment, the feed members 151, 153, 155 (and the ground elements 152, 154, 156, for that matter) may be integrally coupled to an inner surface of the respective wall and extend inwardly therefrom. In another embodiment, a conductive material may be coupled (e.g. soldered, etc.) to the respective wall. In still other embodiments, the feed members 151, 153, 155 may be omitted in favor of a direct connection (of the aforementioned wire, clip, or other conductive material) to an inner wall of the respective wall.

As shown in the embodiment illustrated in FIG. 5A, the second antenna feed member 151 extends inwardly from the top wall 106 of the housing 100 and, in some embodiments, at an end thereof. By extending inwardly from the end of the top wall 106, an overall length of the second antenna 105 (and thus antenna area/volume) may be maximized to accommodate operation at lower frequencies.

Further, a length of the second antenna feed member 151 may be longer than the third antenna feed member 153 and the fourth antenna 111 (individually and, in other embodiments, collectively), again for maximizing the overall length (and thus antenna area/volume) of the second antenna 105. In various embodiments, this may be accomplished in various ways including, but not limited to incorporating an additional trace (not shown) on the PCB 129 between a circuit 130 (to be described later) and the second antenna feed member 151. In various embodiments, the second antenna feed member 151 may be 10%-200% longer than the third antenna feed member 153 and/or the fourth antenna 111. In still other unillustrated embodiments, the second antenna feed member 151 may be sized to have a shorter length (with respect to the third antenna feed member 153 and/or the fourth antenna 111). Still yet, strictly as an option, a first antenna feed member (not shown) of the first antenna 103 may reside on a same side of the housing 100 as the second antenna feed member 151 in order to enhance an envelope correlation coefficient (ECC) during operation.

While the second antenna feed member 151 is shown to extend along an axis that is perpendicular to the first side wall 109 and a thickness of the second antenna feed member 151 is similar to (or even same as) that of the first side wall 109, other embodiments are contemplated where different thicknesses and angles are contemplated. As an additional option, the circuit 130 may be in electrical communication with the second antenna feed member 151 in series with the transceiver 131. In various embodiments, the circuit 130 may include any type of element such as a resistive element, a capacitive element, an inductive element, or any combination thereof; as well as a switch for selectively introducing the aforementioned element into the series coupling between the second antenna feed member 151 and the transceiver 131. In use, such element(s) of the circuit 130 may be used to selectively alter operational characteristics (e.g. frequency bands of operation, etc.) of the antenna.

As further shown, the third antenna 107 and the fourth antenna 111 share a common ground. In the embodiment shown, this is accomplished by the third antenna 107 and the fourth antenna 111 being grounded to the camera 101 in the housing 100. Specifically, a wire, clip, or other conductive material may be used to provide electrical communication between an inner surface of the second top side portion 124 (at the top wall 106) of the housing 100; and a frame, casing (or other component) of the camera 101. In other embodiments, other grounding techniques are contemplated such as grounding to the PCB 129 or another one or more components mounted thereon.

As an additional option, the third antenna 107 and the fourth antenna 111 may be connected to the common ground via spaced, adjacent conductive ground elements 154, 156. In various embodiments, a space between the conductive elements 154, 156 may be varied to adjust an operative length (and thus an area/volume) of the third antenna 107 and the fourth antenna 111, respectively. For example, in one embodiment, the spacing between the ground elements 154, 156 may be reduced (i.e. made more adjacent), thereby elongating an effective length (and surface area/volume) of the respective third antenna 107 and fourth antenna 111, which may improve operation at a desired band of interest.

Further, in an optional embodiment, the conductive ground elements 154, 156 may straddle an infrared light sensor (not shown) of the camera 101. In other embodiments, the conductive ground elements 154, 156 may be consolidated into a single conductive element, such that the common ground is coincidentally positioned, where operational characteristics may be dependent on a volume of the respective antennas 105, 107, 111.

The third antenna feed member 153 extends inwardly adjacent to a center of the top wall 106 of the housing 100. In one possible embodiment, the third antenna feed member 153 may extend inwardly along an axis that is substantially perpendicular to a plane in which the top wall 106 of the housing 100 resides. Further, the fourth antenna feed member 155 extends inwardly adjacent to an end of the top wall 106 of the housing 100. Similar to the third antenna feed member 153, the fourth antenna feed member 155 may extend inwardly along an axis that is perpendicular to a plane in which the top wall 106 of the housing 100 resides. In different embodiments, the fourth antenna feed 155 may be 10%-200% longer than the third antenna feed member 153. In other embodiments, however, it is contemplated that the fourth antenna feed 155 has a shorter length (with respect to the third antenna feed member 153). As mentioned earlier, elongating an effective length (and thus surface area/volume) of a respective antenna may improve operation at a desired band of interest.

By this design, the antennas 105, 107, 111 are configured to operate as loop antennas, in that the antennas 105, 107, 111 form at least a portion of a loop. Specifically, the antennas 105, 107, 111 may each be configured such that the respective feed and ground are located at opposite ends of the corresponding radiating antenna 105, 107, 111, thereby forming a closed loop.

With that said, it should be noted that the antennas 105, 107, 111 may be configured to operate as different types of antennas [e.g. an inverted-F antenna (IFA), slot antenna, etc.]. For example, to accomplish an IFA design in connection with the fourth antenna 111, a position of the fourth antenna feed 155 may be relocated (e.g. closer to a center of the second top side portion 124 of the housing 100). By being configured as an IFA antenna, the antennas 105, 107, 111 may be equipped with a ground, and then a feed, and then an open end arm (not shown) situated along the antenna in such specific order.

Further, the antennas 105, 107, 111 may be particularly suited for use in a mobile phone that is equipped to operate in accordance with advanced cellular protocols (e.g. LTE, LTE-A, 5G). For example, in use in accordance with one possible embodiment; the second, third and fourth antennas 105, 107, 111 may support operation of frequencies up to, including, and even exceeding 5 GHz. Further, the second antenna 105 may support low-band (LB), medium-band (MB), and high-band (HB) operation, as well as licensed assisted access (LAA) which leverages a 5 GHz unlicensed band in combination with a licensed spectrum, for improving performance. As an additional option, the second antenna 105 may use switches to change LB coverage from 700 MHz, to 850 MHz, to 900 MHz, etc. Still yet, the third antenna 107 may support global positioning system (GPS), MIMO MB/HB, and WiFi 2G/5G signaling. Even still, the fourth antenna 111 may support MIMO, MB/HB, and WiFi 2G/5G signaling.

In use, the third antenna 107 may further support enhanced GPS performance with an upper hemisphere isotropic sensitivity (UHIS) ratio that is greater than −3 dB. Further, one or more (or all) isolations between the antennas 105, 107, 111 may be greater than 10 dB. Further, all of the above may be accomplished (in some optional embodiments), via the antennas 105, 107, 111 that are specifically formed by the aforementioned slots 112, 116, 119 in a way that does not materially affect the functionality and aesthetics of the housing 100.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the other features described.

Figures 1, 5B:
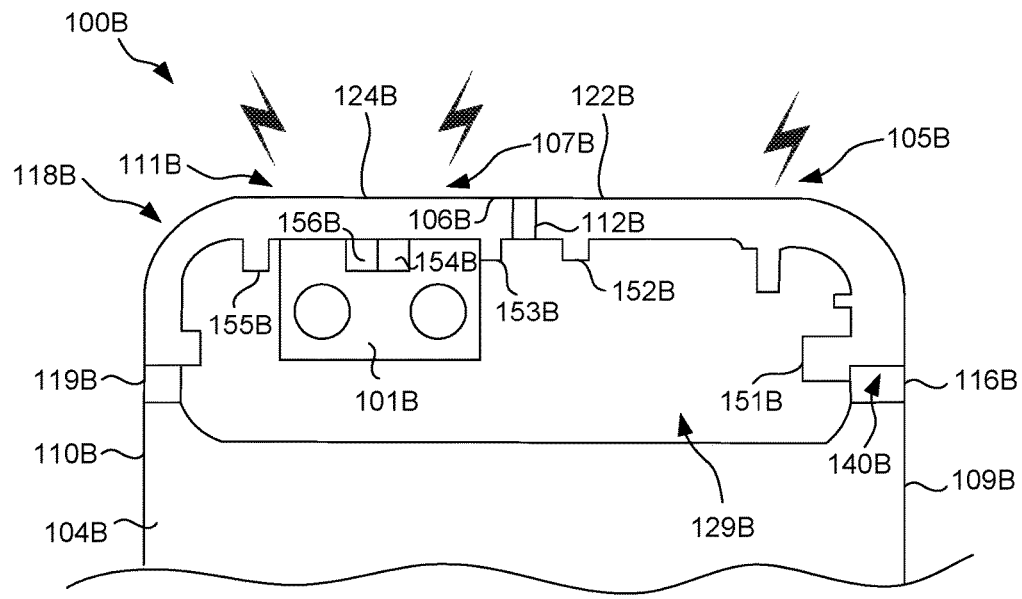
Figures 2, 5B:
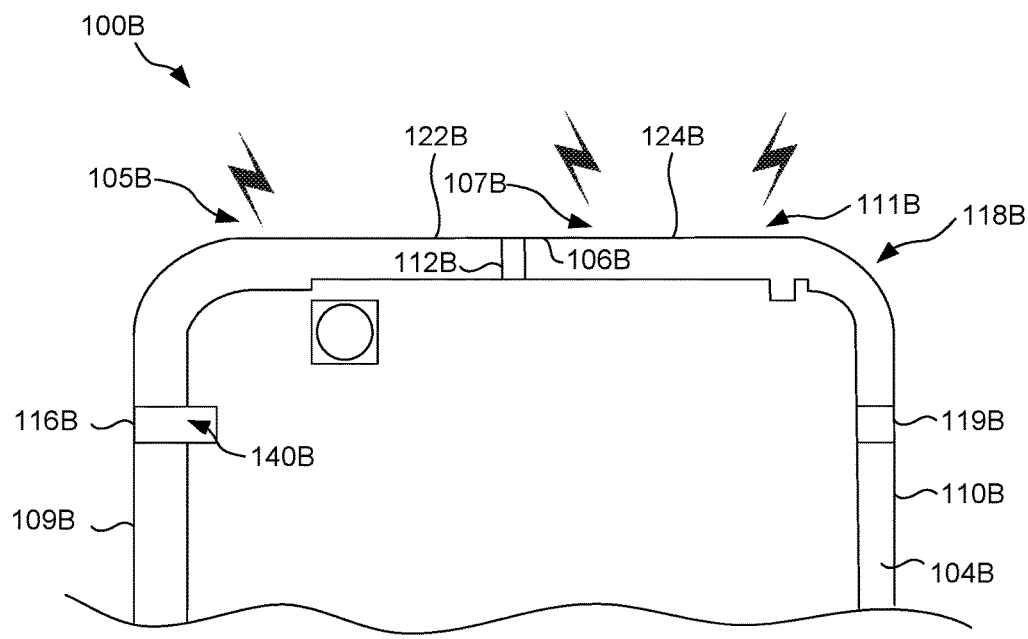

FIG. 5B-1 is a back cross-sectional view of a housing 100B, in accordance with another embodiment. Further, FIG. 5B-2 is a top cross-sectional view of a housing 100B, in accordance with the embodiment shown in FIG. 5B-1. As shown, the housing 100B includes a periphery 104B (that is part of a metal body) having a top wall 106B, and a pair of side walls (including a first side wall 109B and a second side wall 110B).

In use, the housing 100B is configured to operate as at least four antennas including a first antenna (not shown), a second antenna 105B, a third antenna 107B, and a fourth antenna 111B. So that the housing 100B may serve as the antennas 105B, 107B, 111B; a plurality of slots are formed in the housing 100B including a first slot 112B, a second slot 116B, and a third slot 119B. As a further option, an insulative material 140B may be positioned in one or more of the slots 112B, 116B, 119B. The second slot 116B and the third slot 119B are shown to reside adjacent to the top wall 106B for defining a top portion 118B of the periphery 104B. Further, the first slot 112B is formed in the top wall 106B of the housing 100B, for dividing the top portion 118B into a first top side portion 122B that operate as the second antenna 105B, and a second top side portion 124B that operate as both the third antenna 107B and the fourth antenna 111B.

As further shown, the housing 100B has, mounted therein, a PCB 129B with various components (e.g. camera 101B, etc.) installed thereon. Still yet, the second antenna 105B has a second antenna feed member 151B and a second antenna ground 152B, the third antenna 107B has a third antenna feed member 153B and a third antenna ground 154B, and the fourth antenna 111B has a fourth antenna feed member 155B and a fourth antenna ground element 156B, as shown.

The housing 100B of the embodiment shown in FIG. 5B-1 and FIG. 5B-2 may differ with respect to the previous embodiments. For example, in the present possible embodiment, where the housing 100B has a width of 74.8 mm, a length of 153 mm, and a thickness of 6.9 mm, with housing 100B being equipped with a 19 mm dual camera 101B, a metal back face, and seven slots (three slots on a top portion 118B of the periphery 104B and a U-shaped slot on a bottom portion that is not shown); the antennas may provide support for 4×4 MIMO LTE operation, as well as Wifi MIMO, and may further provide a GPS UHIS ratio of −2.5 dB. Further, the antennas 105B, 107B, 111B at the top portion 118B of the periphery 104B may support 5 GHz bands and provide good isolation of better than 10 dB for all antennas. Still yet, the antennas may exhibit a low ECC of 0.6 at 700 MHz bands, and less than 0.5 at 850 MHz bands and above. Specifically, these features may be accomplished by virtue of the second antenna feed member 151B of the second antenna 105B being situated on a same side of the housing 100B as a first antenna feed of a first antenna (not shown).

Figures 1, 5C:
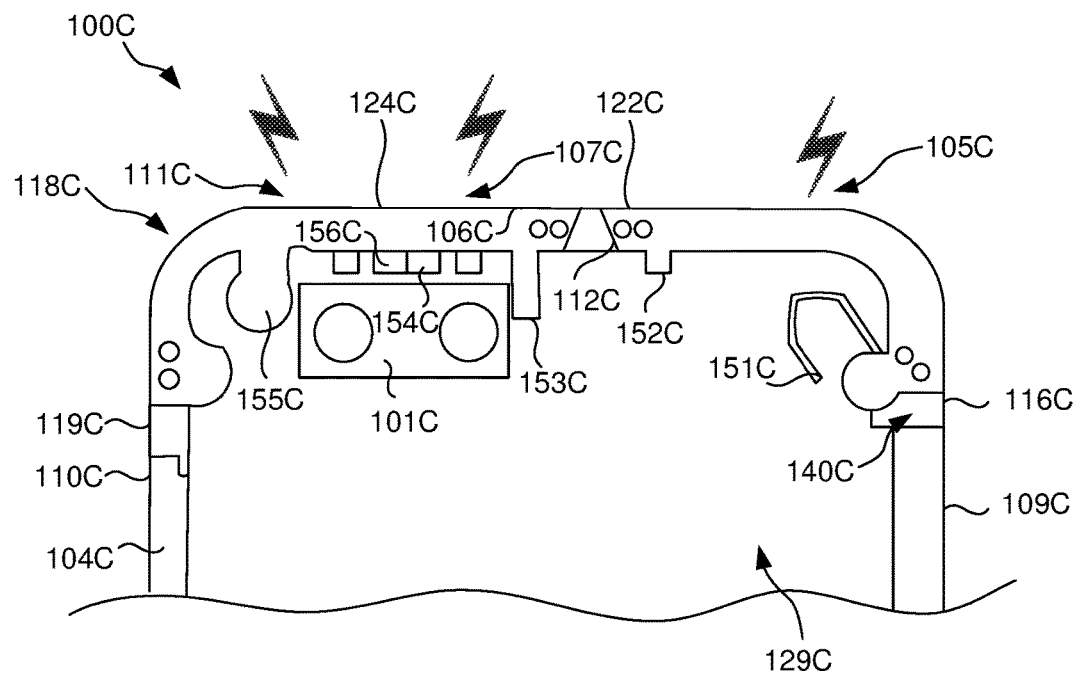
Figures 2, 5C:
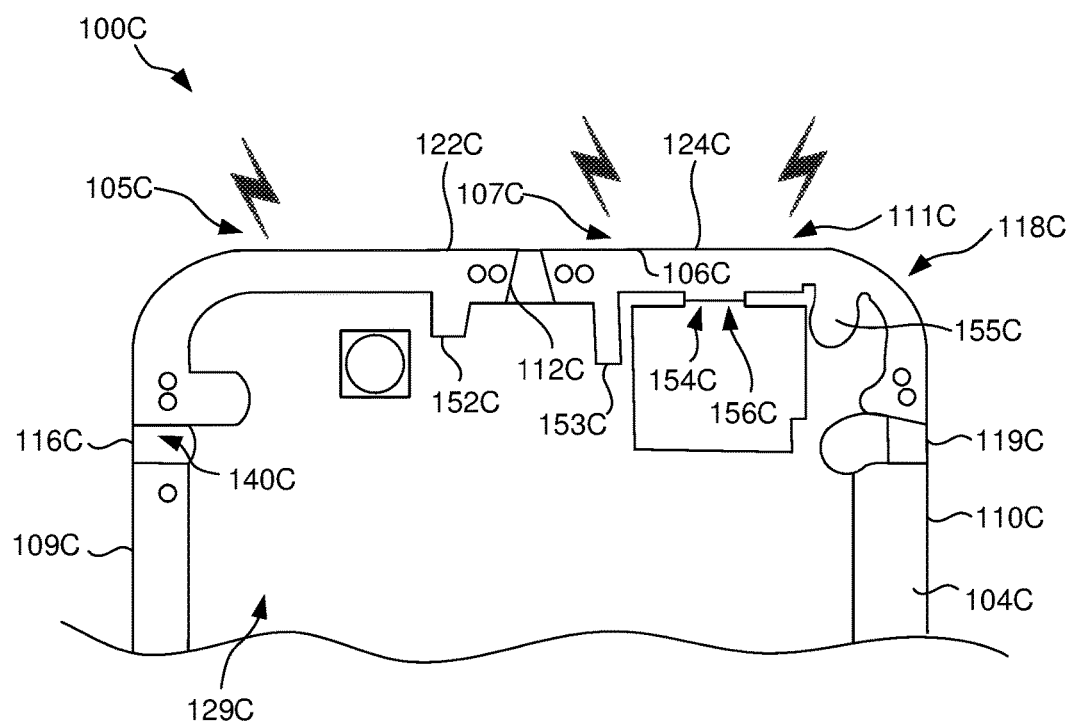

FIG. 5C-1 is a back cross-sectional view of a housing 100C, in accordance with another embodiment. Further, FIG. 5C-2 is a top cross-sectional view of a housing 100C, in accordance with the embodiment shown in FIG. 5C-1. As shown, the housing 100C includes a periphery 104C having a top wall 106C and a pair of side walls (including a first side wall 109C and a second side wall 110C).

In use, the housing 100C is configured to operate as at least four antennas including a first antenna (not shown), a second antenna 105C, a third antenna 107C, and a fourth antenna 111C. So that the housing 100C may serve as the antennas 105C, 107C, 111C; a plurality of slots are formed in the housing 100C including a first slot 112C, a second slot 116C, and a third slot 119C. As a further option, an insulative material 140C may be positioned in one or more of the slots 112C, 116C, 119C. The second slot 116C and the third slot 119C are shown to reside adjacent to the top wall 106C for defining a top portion 118C of the periphery 104C. Further, the first slot 112C is formed in the top wall 106C of the housing 100C, for dividing the top portion 118C into a first top side portion 122C that operate as the second antenna 105C, and a second top side portion 124C that operate as both the third antenna 107C and the fourth antenna 111C.

As further shown, the housing 100C has, mounted therein, a PCB 129C with various components (e.g. camera 101C, etc.) installed thereon. Still yet, the second antenna 105C has a second antenna feed member 151C and a second antenna ground 152C, the third antenna 107C has a third antenna feed member 153C and a third antenna ground 154C, and the fourth antenna 111C has a fourth antenna feed member 155C and a fourth antenna ground element 156C, as shown.

The housing 100C of the embodiment shown in FIG. 5C-1 and FIG. 5C-2 may differ with respect to the previous embodiments. For example, the housing 100C has a width of 74.2 mm, a length of 153.7 mm, and a width of 7.7 mm, with the housing 100C being equipped with a 19 mm dual camera 101C, a glass back cover, and seven slots (three slots on a top portion 118C of the periphery 104C and four slots on a bottom portion that is not shown with a 1.5 mm slot width); the antennas may provide support for 4×4 MIMO LTE operation, as well as Wifi MIMO, and may further provide a GPS UHIS ratio of −3 dB. Further, the antennas 105C, 107C, 111C at the top portion 118C of the periphery 104C may support 5 GHz bands and provide good isolation of better than 10 dB for all antennas. Still yet, the antennas may exhibit a low ECC of 0.6 at 700 MHz bands, and less than 0.5 at 850 MHz bands and above. Specifically, these features are accomplished by virtue of the second antenna feed member 151C of the second antenna 105C being situated on a same side of the housing 100C as a first antenna feed of a first antenna (not shown).

Figures 1, 5D:
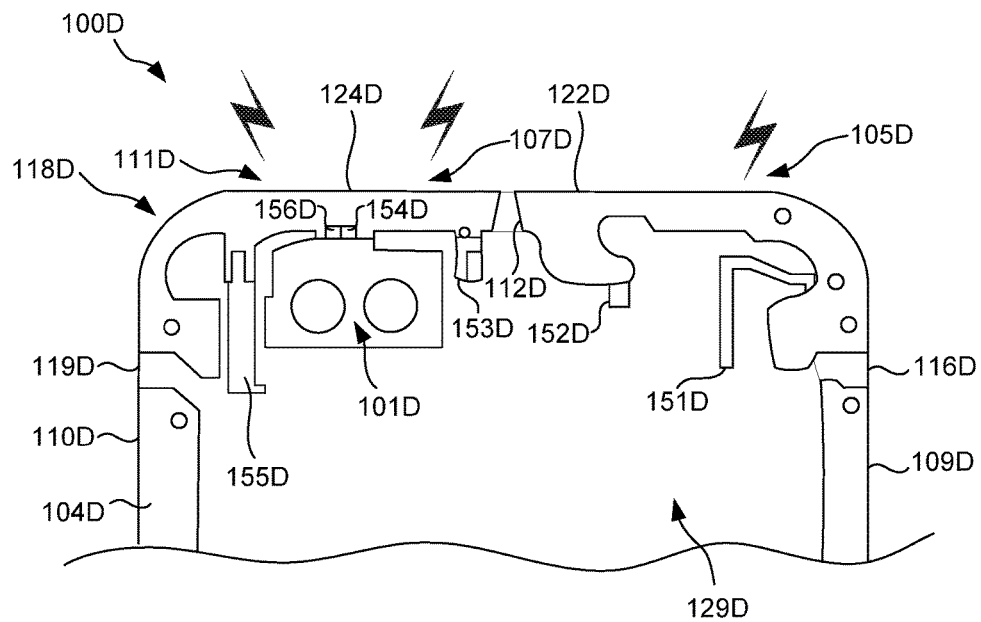
Figures 2, 5D:
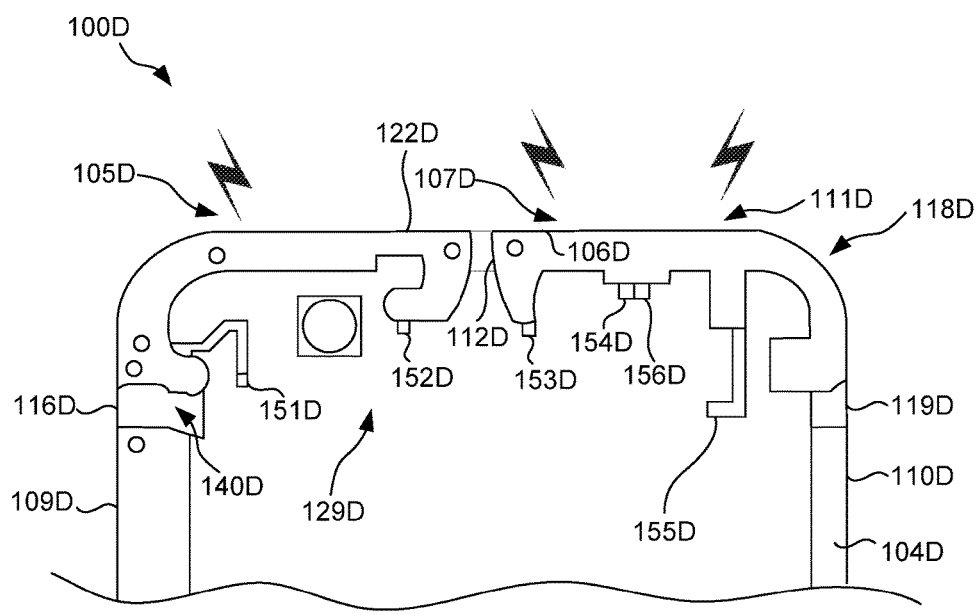

FIG. 5D-1 is a back cross-sectional view of a housing 100D, in accordance with another embodiment. Further, FIG. 5D-2 is a top cross-sectional view of a housing 100D, in accordance with the embodiment shown in FIG. 5D-1. As shown, the housing 100D includes a periphery 104D having a top wall 106D and a pair of side walls (including a first side wall 109D and a second side wall 110D).

In use, the housing 100D is configured to operate as at least four antennas including a first antenna (not shown), a second antenna 105D, a third antenna 107D, and a fourth antenna 111D. So that the housing 100D may serve as the antennas 105D, 107D, 111D; a plurality of slots are formed in the housing 100D including a first slot 112D, a second slot 116D, and a third slot 119D. As a further option, an insulative material 140D may be positioned in one or more of the slots 112D, 116D, 119D. The second slot 116D and the third slot 119C are shown to reside adjacent to the top wall 106D for defining a top portion 118D of the periphery 104D. Further, the first slot 112D is formed in the top wall 106D of the housing 100D, for dividing the top portion 118D into a first top side portion 122D that operate as the second antenna 105D, and a second top side portion 124D that operate as both the third antenna 107D and the fourth antenna 111D.

As further shown, the housing 100D has, mounted therein, a PCB 129D with various components (e.g. camera 101D, etc.) installed thereon. Still yet, the second antenna 105D has a second antenna feed member 151D and a second antenna ground 152D, the third antenna 107D has a third antenna feed member 153D and a third antenna ground 154D, and the fourth antenna 111D has a fourth antenna feed member 155D and a fourth antenna ground element 156D, as shown.

The housing 100D of the embodiment shown in FIG. 5D-1 and FIG. 5D-2 may differ with respect to the previous embodiments. For example, the housing 100D has a width of 71.7 mm, a length of 152 mm, and a width of 6.96 mm, with the housing 100D being equipped with a 21.5 mm dual camera 101D, a glass back cover, and five slots (three slots on a top portion 118D of the periphery 104D and two slots on a bottom portion that is not shown with a 1.5 mm slot width); the antennas may provide support for 4×4 MIMO LTE operation, as well as Wifi MIMO, and may further provide a GPS UHIS ratio of −2.5 dB. Further, the antennas 105D, 107D, 111D at the top portion 118D of the periphery 104D may support 5 GHz bands and provide good isolation of better than 10 dB for all antennas. Still yet, the antennas may exhibit a low ECC of 0.6 at 700 MHz bands, and less than 0.5 at 850 MHz bands and above.

Figure 5E:
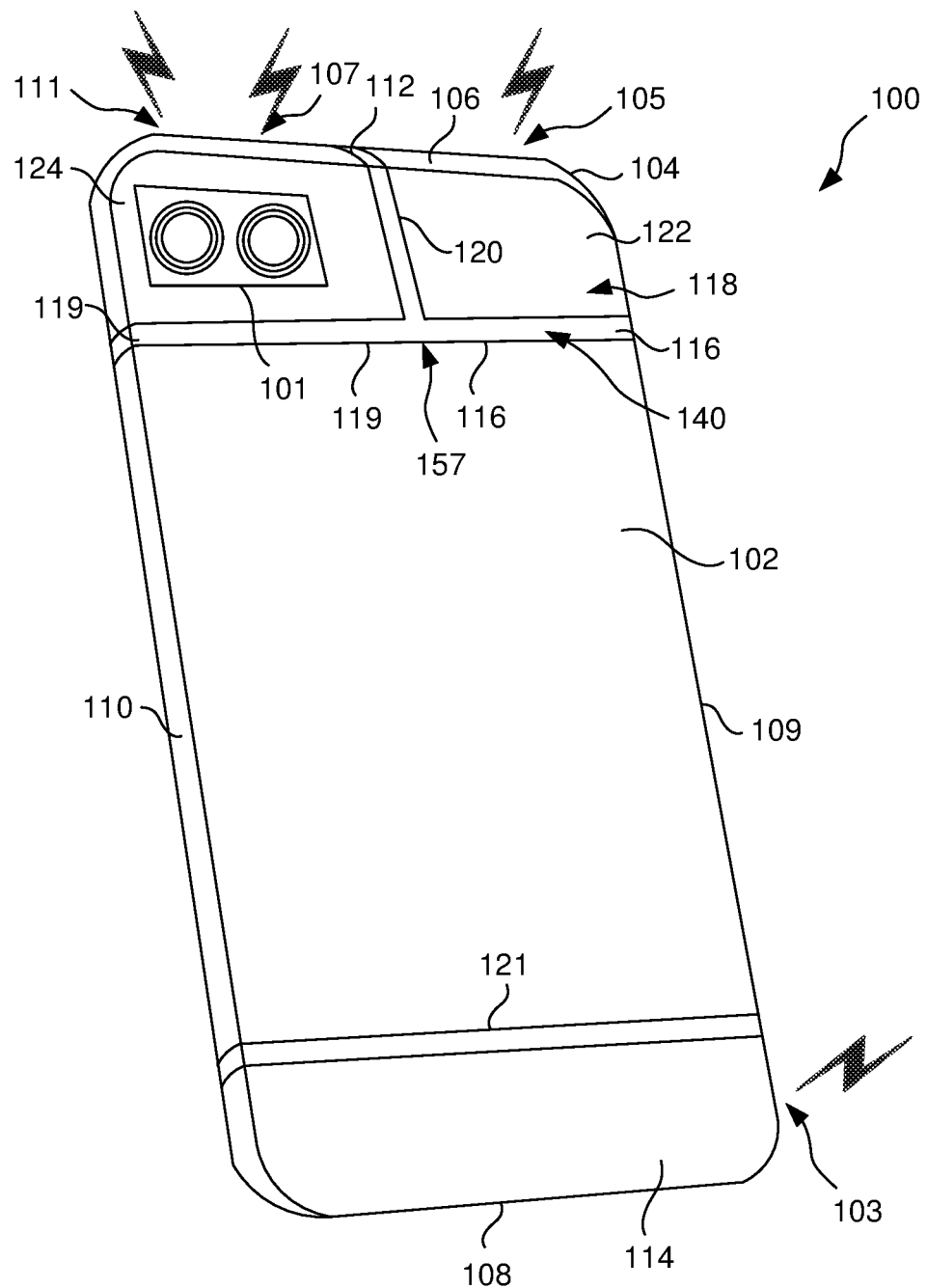
FIG. 5E is perspective of the housing of FIGS. 1-5A, in accordance with another embodiment with the aforementioned slots forming a continuous slot.

FIG. 5E is perspective of the housing 100 of FIGS. 1-5A, in accordance with another embodiment with the aforementioned slots 112, 116, 119 forming a continuous slot 157. As shown, the second slot 116 formed in the first side wall 109 and the third slot 119 formed in the second side wall 110 are part of a continuous slot 157 formed in the back face 102 of the housing 100. Further, the first slot 112 formed in the top wall 106 is further formed in the back face 102 of the housing 100 and extends to and is part of the continuous slot 157. Still yet, as compared to the embodiment of the housing 100 shown in FIG. 1, the continuous slot 157 of the housing 100 shown in FIG. 5E may be positioned lower on the housing 100, to afford greater antenna area/volume.

By this design, the continuous slot 157 (and any insulation 140 therein) may further insulate the first top side portion 122 and the second top side portion 124 so that they remain electrically insulated with respect to each other, as well as with respect to the bottom portion 114 of the housing 100. Thus, the back face 102 of the housing 100 and the periphery 104 may be integrally coupled (e.g. unitary), without necessarily requiring an insulation therebetween and without necessarily requiring the back face 102 be manufactured from an insulative material (e.g. glass, etc.).

Thus, in each of the foregoing embodiments, a slot means (e.g. the slots 112, 116, 119, etc. of FIGS. 1 and/or 5E) is etched in a housing means (e.g. the housing 100 of FIGS. 1 and/or 5E), for the purpose of dividing the housing means into separate portions that are capable of operating as at least four antennas. By this design, the housing means may serve as four antennas possibly configured to operate as a 4×4 MIMO antenna that may be particularly useful to accommodate operating frequencies used in connection with advanced cellular protocol standards such as 4G, LTE, LTE-A, 5G and further advancements thereof, etc.

Figure 6:
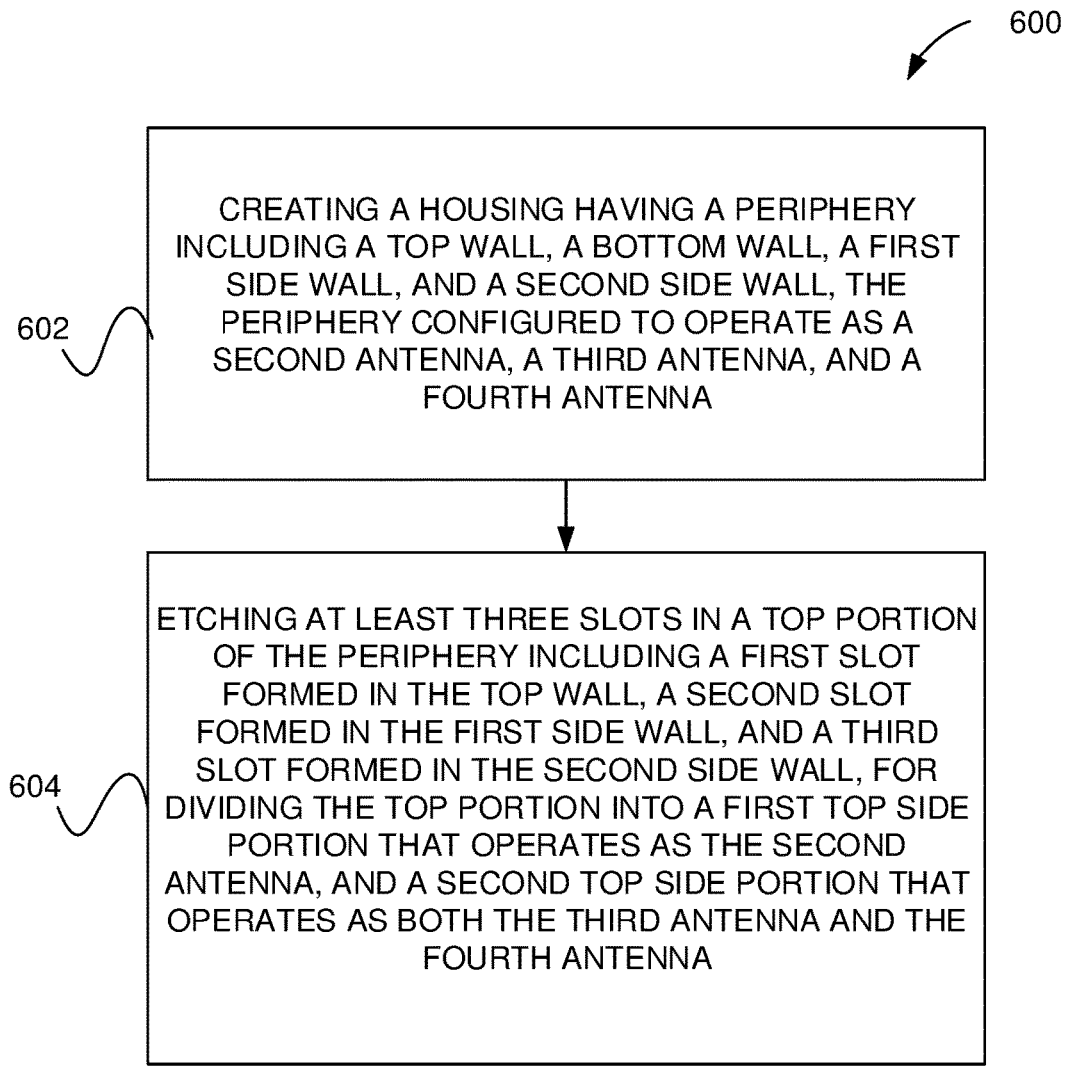
FIG. 6 is a method for constructing a housing that is configured to operate as four conformal antennas, in accordance with another embodiment.

FIG. 6 is a method 600 for constructing a housing that is configured to operate as four conformal antennas, in accordance with another embodiment. As an option, the method 600 may be implemented in the context of any one or more of the embodiments set forth in any previous and/or subsequent figure(s) and/or the description thereof. For example, in one embodiment, the method 600 may be used to manufacture the housing 100 of FIGS. 1 and/or 5E. However, it is to be appreciated that the method 600 may be implemented in other suitable environments.

As shown in operation 602, a housing (e.g. housing 100 of FIGS. 1 and/or 5E) is created having a back face and a periphery including a top wall, a bottom wall, a first side wall, and a second side wall. Such housing may be created by cutting, forming, stamping, and otherwise processing a metal material to provide the housing. Further, the housing is configured to operate as at least four antennas, and includes a top portion, and a bottom portion that is configured to operate as a first antenna of the four antennas.

With continuing reference to FIG. 6, at least three slots are etched in the top portion, per operation 604. In various embodiments, the slots may be etched in any desired manner including, but not limited to cutting or stamping the surface, or any other processing that results in the slots being formed. Further, such slots include a first slot formed in the top wall, a second slot formed in the first side wall, and a third slot formed in the second side wall, for dividing the top portion into a first top side portion that operates as a second antenna of the four antennas, and a second top side portion that operates as both a third antenna and a fourth antenna of the four antennas.

Figure 7A:
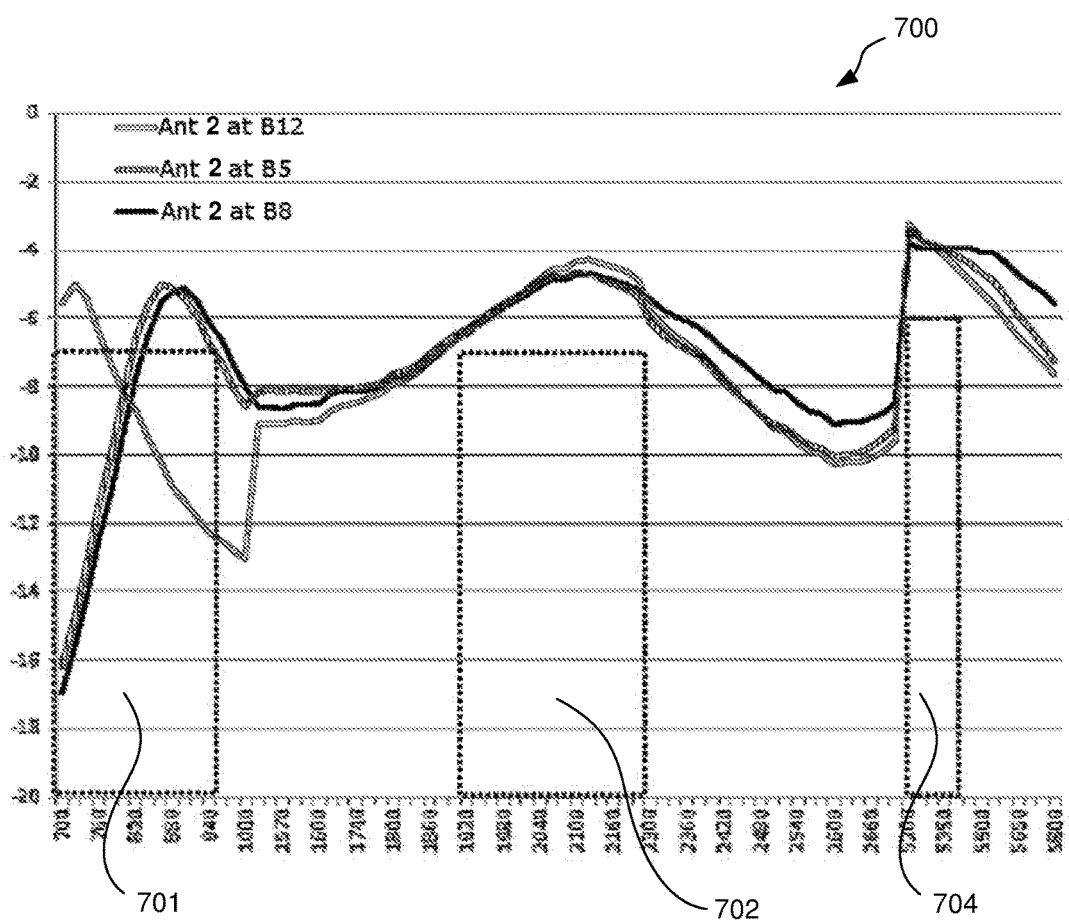
FIG. 7A is a chart illustrating exemplary antenna efficiency that is exhibited in connection with operation of the embodiment of FIG. 1, in accordance with one embodiment.

FIG. 7A is a chart illustrating exemplary antenna efficiency 700 that is exhibited in connection with operation of the embodiment of FIG. 1, in accordance with one embodiment. Specifically, the chart of FIG. 7A illustrates exemplary antenna efficiency 700 that is exhibited by the second antenna 105 of the housing 100 of FIG. 1.

The efficiency of the antenna is measured by an amount of energy (voltage squared) received at the receiving antenna over air, divided by an amount of energy transmitted to the antenna. This is thus an overall test because the energy is transported to the antenna port, radiated by the transmitting antenna, propagated as electromagnetic waves through the air, received by the receiving antenna, and converted back to current on the receiving antenna ports. While the transmitting antenna is transmitting, the receiving antenna will collect a 3-dimensional radiation pattern, and then aggregate the data. Assuming half the transmitted power is received, then, 10*log 10 (0.5/1.0)=−3 dB. To this end, a larger negative number is indicative of better performance (i.e. more energy is being delivered from one antenna to another).

As shown in FIG. 7A, the antenna efficiency 700 of the second antenna 105 is exhibited in connection with three LTE tuning states (e.g. B12 to B5 to B8). As indicated, a low-band performance range 701, a mid-band performance range 702 (which can cover multiple bands), and a 5 GHz band performance range 704 (for additional connectivity such as WiFi, 5G, or LAA) are provided.

Figure 7B:
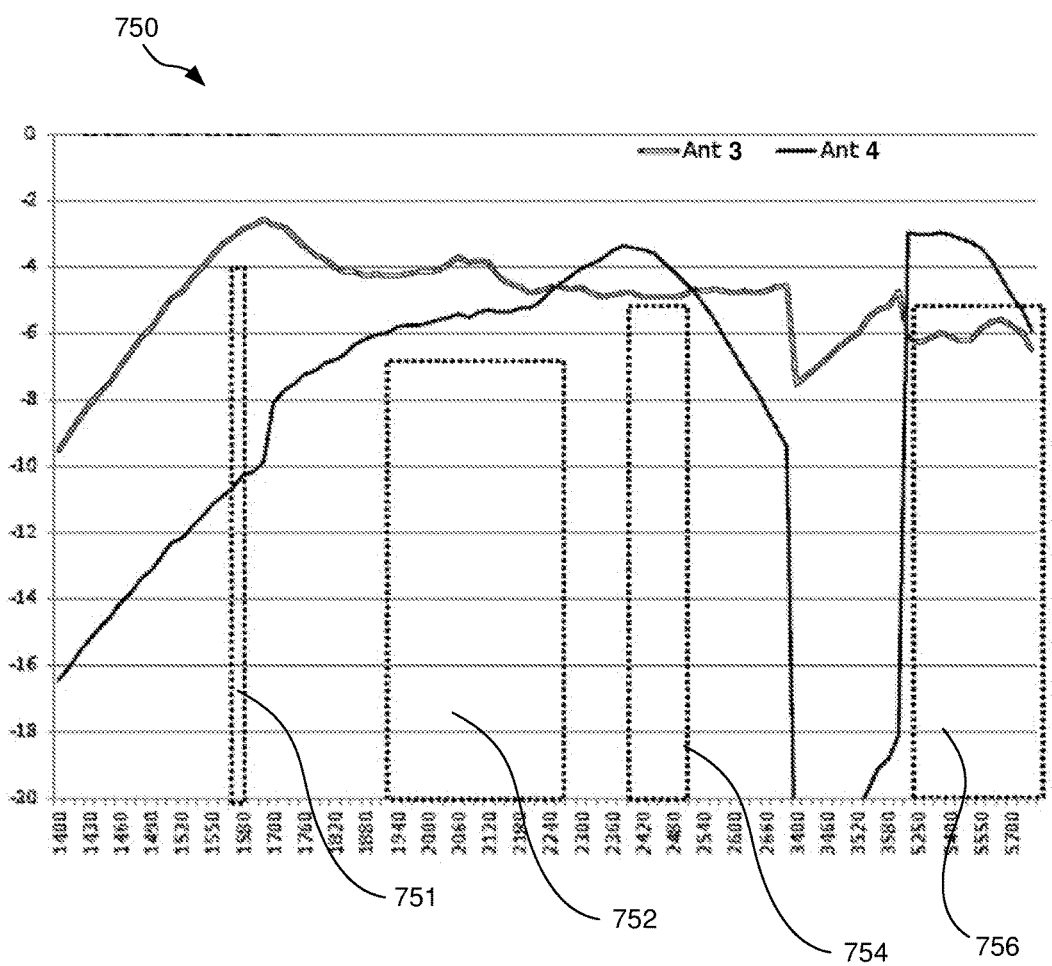
FIG. 7B is another chart illustrating exemplary antenna efficiency that is exhibited in connection with operation of the embodiment of FIG. 1, in accordance with one embodiment.

FIG. 7B is another chart illustrating exemplary antenna efficiency 750 that is exhibited in connection with operation of the embodiment of FIG. 1, in accordance with one embodiment. Specifically, the chart of FIG. 7B illustrates exemplary antenna efficiency 750 that is exhibited by the third antenna 107 and the fourth antenna 111 of the housing 100 of FIG. 1. GPS performance 751 is shown in FIG. 7B in connection with the third antenna 107 of the housing 100 of FIG. 1. Further, a mid-band performance range 752 (which can cover multiple bands) is provided, along with a WiFi 2G performance range 754 (via a main- or subantenna). Still yet, a 5 GHz band performance range 756 (for additional connectivity such as WiFi, 5G, or LAA) is provided (via a main- or sub-antenna).

One or more of the foregoing features of the aforementioned embodiments may thus provide a housing (e.g. phone housing) with at least four antennas. To accomplish this, three slots are formed in the housing. In some optional embodiments, such slots are formed in a manner that divides the housing into symmetrical portions, for aesthetic purposes. By this design, the housing may serve as four antennas possibly configured to operate as a 4×4 MIMO antenna that may be particularly useful to accommodate operating frequencies used in connection with advanced cellular protocol standards such as 4G, LTE, LTE-A, 5G and further advancements thereof, etc. This may, in turn, result in effective and/or efficient communication using relevant standards that would otherwise be foregone in systems that lack such features. It should be noted that the aforementioned potential advantages are set forth for illustrative purposes only and should not be construed as limiting in any manner.

Figure 8:
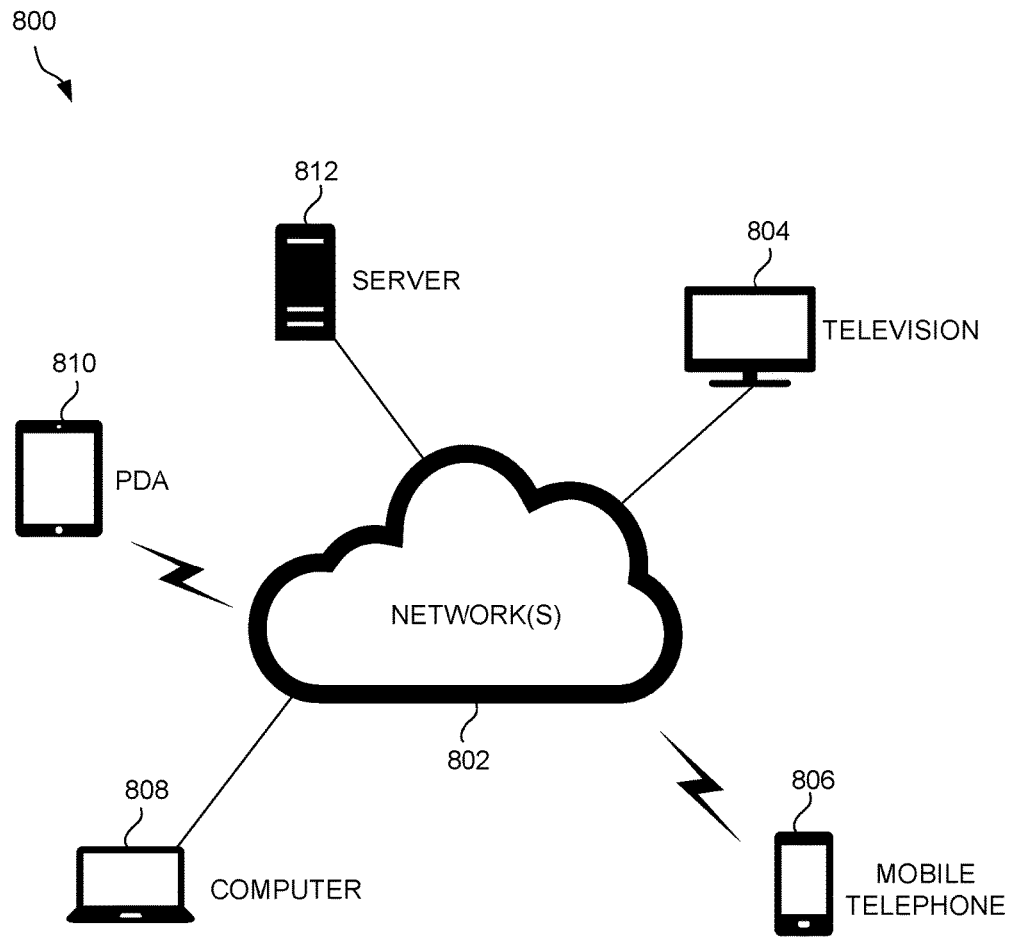
FIG. 8 is a diagram of a network architecture, in accordance with an embodiment.

FIG. 8 is a diagram of a network architecture 800, in accordance with an embodiment. As shown, at least one network 802 is provided. In various embodiments, any one or more components/features set forth during the description of any previous figure(s) may be implemented in connection with any one or more of the components of the at least one network 802.

In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server 812 and a computer 808 may be coupled to the network 802 for communication purposes. Such computer 808 may include a desktop computer, lap-top computer, and/or any other type of logic. Still yet, various other devices may be coupled to the network 802 including a personal digital assistant (PDA) device 810, a mobile phone device 806, a television 804, etc.

Figure 9:
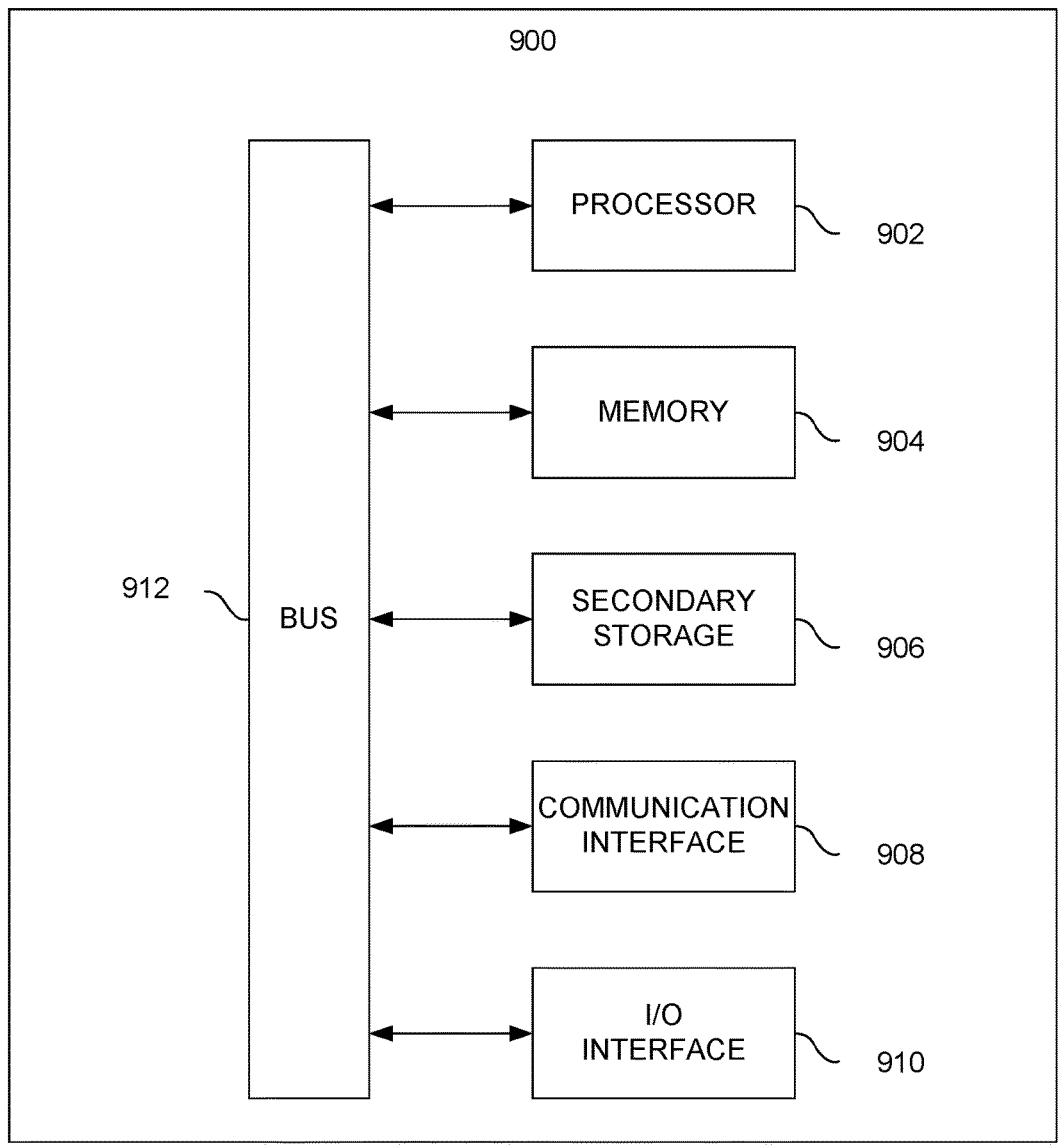
FIG. 9 is a diagram of an exemplary processing device, in accordance with an embodiment.

FIG. 9 is a diagram of an exemplary processing device 900, in accordance with an embodiment. As an option, the processing device 900 may be implemented in the context of any of the devices of the network architecture 800 of FIG. 8. However, it is to be appreciated that the processing device 900 may be implemented in any desired environment.

As shown, the processing device 900 includes at least one processor 902 which is connected to a bus 912. The processing device 900 also includes memory 904 [e.g., hard disk drive, solid state drive, random access memory (RAM), etc.] coupled to the bus 912. The memory 904 may include one or more memory components, and may even include different types of memory. Further included is a communication interface 908 (e.g. local/remote network interface, memory access interface, etc.) and an input/output (I/O) interface 910 (e.g. display, speaker, microphone, touchscreen, touchpad, mouse interface, etc.).

The processing device 900 may also include a secondary storage 906. The secondary storage 906 coupled to the bus 912 and/or to other components of the processing device 900. The secondary storage 906 can include, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the memory 904, the secondary storage 906, and/or any other memory, for that matter. Such computer programs, when executed, enable the processing device 900 to perform various functions (as set forth above, for example). Memory 904, secondary storage 906 and/or any other storage comprise non-transitory computer-readable media.

It should be understood that the arrangement of components illustrated in the Figures described are exemplary and that other arrangements are possible. It should also be understood that the various system components defined by the claims, described below, and illustrated in the various block diagrams represent logical components in some systems configured according to the subject matter disclosed herein.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations such as from about 1 to about 10 includes, 2, 3, 4, etc.; greater than 0.10 includes 0.11, 0.12, 0.13, etc. For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R\ R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means+−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An apparatus, comprising:
   a housing having a periphery and a back face, the back face walled around by the periphery along edges of the back face, wherein the housing is at least partially conductive and is configured to operate as a second antenna, a third antenna, and a fourth antenna, the periphery including:
   a top wall having a first slot formed therein;
   a first side wall having a second slot formed therein; and
   a second side wall having a third slot formed therein, the top wall arranged between the first side wall and the second side wall, wherein a top portion of the periphery is defined between the second slot and the third slot, wherein the top portion is divided into a first top side portion and a second top side portion via the first slot, wherein the first top side portion operates as the second antenna, and wherein the second top side portion operates as both the third antenna and the fourth antenna.

2. The apparatus of claim 1, wherein the second antenna includes a second antenna feed extending inwardly from the top wall of the housing, and a second antenna ground.

3. The apparatus of claim 1, wherein the third antenna is configured to cooperate with a global positioning system so as to exhibit an upper hemisphere isotropic sensitivity (UHIS) ratio that is greater than −3 dB.

4. The apparatus of claim 2, and further comprising:
   a configurable element in electrical communication with the second antenna feed.

5. The apparatus of claim 4, wherein the configurable element includes a switch and at least one of a resistive element, a capacitive element, or an inductive element.

6. The apparatus of claim 1, wherein the second antenna is configured to be switched between a first mode of operation for operating at a first frequency range and a second mode of operation for operating at a second frequency range.

7. The apparatus of claim 1, wherein a first size of the first top side portion and a second size of the second top side portion are the same.

8. The apparatus of claim 1, wherein the third antenna and the fourth antenna share a common ground.

9. The apparatus of claim 8, wherein the third antenna and the fourth antenna are connected to the common ground via spaced adjacent fixed conductive elements.

10. The apparatus of claim 1, wherein the third antenna and the fourth antenna are grounded to a camera in the housing.

11. The apparatus of claim 1, wherein the third antenna includes a third antenna feed extending inwardly adjacent to a center of the top wall of the housing.

12. The apparatus of claim 1, wherein the fourth antenna includes a fourth antenna feed extending inwardly from the top wall of the housing.

13. The apparatus of claim 1, wherein the four antennas are configured to operate as a 4×4 multiple-in-multiple-out (MIMO) antenna.

14. The apparatus of claim 1, and further comprising:
   an insulative material positioned in each of the slots.

15. The apparatus of claim 1, wherein the second slot formed in the first side wall and the third slot formed in the second side wall are parts of a continuous slot formed in the back face of the housing, and the first slot formed in the top wall is further formed in the back face of the housing and extends to the continuous slot.

16. A system comprising the apparatus of claim 1, where the system includes a mobile phone.

17. A method, comprising:
   creating a housing having a periphery and a back face, the back face walled around by the periphery along edges of the back face, wherein the periphery includes a top wall a first side wall, and a second side wall, the housing is at least partially conductive and is configured to operate as a second antenna, a third antenna, and a fourth antenna; and
   etching at least three slots in a top portion of the periphery including a first slot formed in the top wall, a second slot formed in the first side wall, and a third slot formed in the second side wall, for dividing the top portion into a first top side portion that operates as the second antenna, and a second top side portion that operates as both the third antenna and the fourth antenna.

18. A system, comprising:

a mobile device including a housing having a periphery and a back face, the back face walled around by the periphery along edges of the back face, wherein the housing is at least partially conductive and is configured to operate as a second antenna, a third antenna, and a fourth antenna, the periphery including:

a top wall having a first slot formed therein;

a first side wall having a second slot formed therein; and a second side wall having a third slot formed therein, the top wall arranged between the first side wall and the second side wall, wherein a top portion of the periphery is defined between the second slot and the third slot, wherein the top portion is divided into a first top side portion and a second top side portion via the first slot, wherein the first top side portion operates as the second antenna, and wherein the second top side portion operates as both the third antenna and the fourth antenna.

19. The system of claim 18, wherein the second antenna includes a second antenna feed extending inwardly from the top wall of the housing, and a second antenna ground.

20. The system of claim 18, wherein the third antenna and the fourth antenna share a common ground.

21. The system of claim 18, wherein the third antenna and the fourth antenna are grounded to a camera in the housing.

22. The system of claim 18, wherein the third antenna includes a third antenna feed extending inwardly adjacent to a center of the top wall of the housing.

23. The system of claim 18, wherein the fourth antenna includes a fourth antenna feed extending inwardly from the top wall of the housing.

24. The system of claim 18, and further comprising:

an insulative material positioned in each of the slots.

25. The system of claim 18, wherein the second slot formed in the first side wall and the third slot formed in the second side wall are parts of a continuous slot formed in the back face of the housing, and the first slot formed in the top wall is further formed in the back face of the housing and extends to the continuous slot.

* * * * *